M. P. BROGAN.
REFLECTOR.
APPLICATION FILED JAN. 24, 1920.
1,401,870.
Patented Dec. 27, 1921.
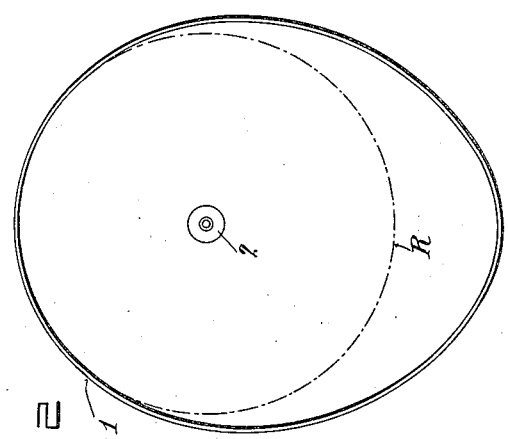
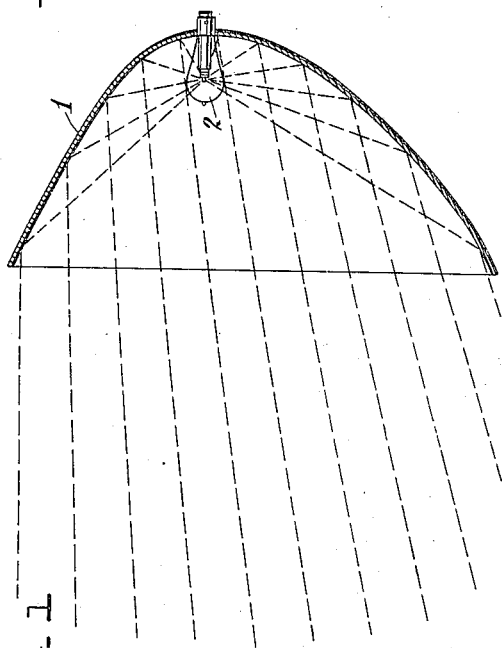
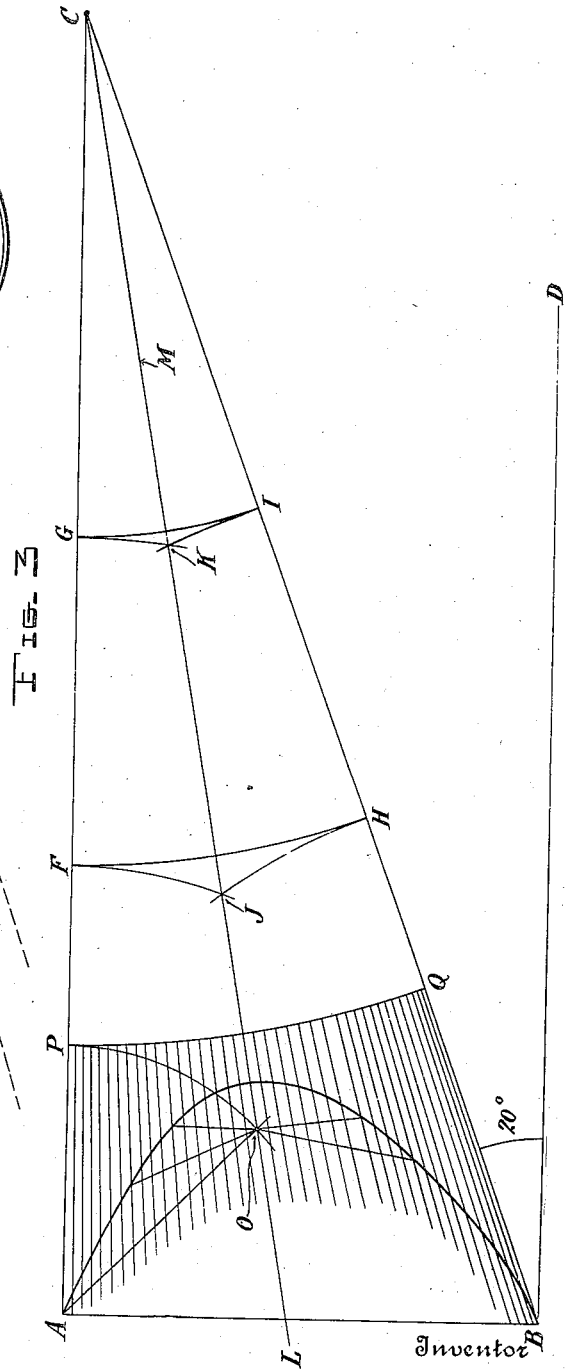
Witnesses
Inventor
Maurice P. Brogan,
By
Attorney

UNITED STATES PATENT OFFICE.

MAURICE P. BROGAN, OF OMAHA, NEBRASKA.

REFLECTOR.

1,401,870. Specification of Letters Patent. Patented Dec. 27, 1921.

Application filed January 24, 1920. Serial No. 353,842.

*To all whom it may concern:*

Be it known that I, MAURICE P. BROGAN, a citizen of the United States, residing at Omaha, in the county of Douglas and State of Nebraska, have invented new and useful Improvements in Reflectors, of which the following is a specification.

My present invention relates to improvements in reflectors for projecting light for illuminating purposes, and the invention is more particularly applicable to reflectors used in connection with headlights of automobiles, or other vehicles, for illuminating the road or highway and objects on such road.

The primary object of the invention is to provide a novel and improved reflector which, as applied to the headlights of automobiles or other vehicles, is capable of eliminating the objectionable glare in the eyes of persons approaching or looking toward the headlights from the front thereof, and yet will produce uniform and effective distribution of the light rays, and hence efficient illumination of the road surface, with respect to distant areas, areas immediately in front of the vehicle and all intermediate areas in front of the vehicle is attained, and furthermore the reflector, in its preferred form, so distributes the side rays as to uniformly illuminate the proper width of the road or highway with respect to all areas of its surface, whether such areas are near to the front of the vehicle, at a distance therefrom, or at intermediate points.

These objects are attained by providing a reflector, the surface of which is so curved that most of the light rays are deflected downwardly at differing angles below the level of the reflector, and these deflected rays are spread, thus eliminating glare, and the divergence of the downwardly deflected rays is so graduated that the degree of divergence increases regularly or equally from point to point, and hence the distribution of the light is uniform and all of the light is utilized in illuminating the surface of the road or highway. The uppermost rays, however, are parallel, or substantially so, and they will be projected horizontally for a distance which is limited only by the candle power of the lamp or source of illumination, in consequence of which the distant portion of the road or highway and also any large obstructions therein will be amply illuminated.

In the accompanying drawing—

Figure 1 represents a section taken centrally and vertically through a reflector constructed in accordance with the present invention;

Fig. 2 is a front view of the reflector as shown in Fig. 1; and

Fig. 3 is a diagram illustrating the manner in which the curvature of the reflector is generated.

While the present invention is applicable generally to reflectors adapted for the projection of light for various purposes, thus adapting it for use in connection with headlights for vehicles, search lights and projectors such as those generally used for illuminating purposes, the invention is particularly applicable to reflectors adapted for use in connection with the headlights of automobiles for the elimination of glare, which has proven to be objectionable and dangerous, and to secure efficient and uniform illumination of the road or highway to insure safe driving. The preferred embodiment of the invention will be herein shown and described as applied to reflectors for automobile headlights; but it is to be understood that the invention is not restricted to the precise embodiment shown, as equivalent constructions or variations within the scope of the invention are contemplated and these will be included within the scope of the claims.

As shown in Figs. 1 and 2 the reflector comprises a body or shell 1 which may be pressed or otherwise formed from sheet metal and provided with a suitably polished interior surface, and a lamp 2 preferably of the incandescent electric type, such as those generally used in electric headlights. The reflector may be fitted into a suitable lamp casing, and the front of the reflector may be closed, as usual, by a glass front or lens. The filament of the lamp which constitutes the source of illumination is in the focus of the reflector surface and the curvature of the reflector surface taken in its central vertical plane, is such that the topmost rays from the reflector will be projected horizontally, assuming that the reflector occupies its upright position. These topmost rays will be projected in front of the reflector for a distance which will be limited only by the candle power of the lamp or source of illumination, and these rays will effectively illuminate the distant portion of the road or highway and any distant obstructions. All of the light rays below the topmost ones, however, are deflected downwardly, at differing angles of divergence, the angle of divergence of these rays increasing gradually or to equal degrees from point to point as the bottom of the reflector is approached, in consequence of which the majority of the light rays projected by the reflector will be spread uniformly over the area of the road surface from the most distant point to a point immediately in front of the vehicle, thus avoiding either under illumination or over illumination of any area, as well as concentration of parallel rays which would produce glare.

The curvature of the reflector in a plane taken centrally and vertically therethrough and by which these results are attained, is formed preferably as follows, reference being had particularly to Fig. 3. Having determined the maximum diameter of the reflector desired, which is usually about nine inches, and also the maximum angle of deflection desired, the most efficient maximum angle being about 20°, although this angle may be varied, a line AB is drawn of a length corresponding to the maximum diameter of the desired reflector, and the parallel lines AC and BD are drawn perpendicular to the line AB at its ends, and a line BC is then drawn through the point of intersection B at an angle of 20° to the line BD, this line being produced until it meets the line AC at some point C, then take any convenient point on the line AC as the point G and with GC as a radius and C as the center describe the arc GI which will intersect the lines AC and BC at points G and I respectively. With AG as a radius and A as a center describe the arc GK, and also with BI as a radius and B as a center describe the arc IK. The arcs GK and IK will intersect at some point K. Now take any convenient point on the line AC, as F, and describe the arcs FH, FJ and HJ using the points C, A and B respectively as centers to obtain the point J. A line LM is then drawn through these two points J and K, this line being the locus of all foci of curves which will pass through the points A and B which, when drawn in the manner hereinafter prescribed, will produce a maximum deflection of 20°. Any convenient point O on the line LM may be selected as the focus of the reflector curve to be drawn. Preferably this point O is obtained by drawing a line AO at an angle of 45° to the line AC from the point A until such line intersects the line LM, the focus O being thus obtained. With AO as a center an arc OP is described, this arc intersecting the line AC at the point P. With PC as a radius and C as a center, the arc PQ is described. The point O thus becomes the focus and the arc PQ the directrix of the curve to be drawn. The definition of the curve to be drawn is, like that of a parabola, that every point in the curve is equidistant from the focus O and the directrix PQ. The curve is so drawn in Fig. 3. By this method the curve for a lamp of any desired diameter and for any desired maximum degree and deflection can be obtained.

The reflected light rays from a curve constructed in the manner described are always perpendicular to the directrix line, no section of the curves being exactly the section of any standard curve, and owing to the difference in the method of generating the curve as compared with the method of generating a parabolic curve, the amount of its divergence from a parabolic curve is exactly graduated and increased equally from point to point. In consequence, the topmost rays of the light beam projected by the reflector will be horizontal, while the deviation of the reflector from a parabolic shape causes the light rays below the topmost rays to be deflected downwardly, the angle of deflection increasing gradually or by regular or equal amounts from point to point, as the lower edge of the reflector is approached until the maximum deflection of the light rays is reached at the bottom of the reflector. The result is that a substantially rectangular area of the road surface is illuminated with equal intensity at all distances from the reflector.

The curvatures to be given the reflector surface in all planes other than the central vertical plane, the curvature of which has just been described, may be selected to meet different requirements. It is preferable, however, to shape the front of the reflector substantially as shown in Fig. 2. In this figure the circle R would represent the peripheral edge of an ordinary parabolic reflector as viewed from the front. The front edge of the reflector embodying the present invention is preferably somewhat egg-shape, its deviation from the circle representing the front edge of a parabolic reflector corresponding at every point to the deviation of the curved reflector surface of Figs. 1 or 2 from a true parabolic surface. The greater flare of the side sections of the reflector as compared with the side sections of a parabolic reflector therefore causes spreading of the light rays to each side of the deflector, thus avoiding concentration of parallel rays which, in using parabolic reflectors, cause glare, and this spreading of the side rays causes the same width of the road to be illuminated at all distances from the reflector. The lower side rays, since the reflector has the greatest flare or deviation from the parabolic reflector at such point, will spread or diverge at the greatest angle, but since these rays are deflected at the greatest angle, they strike the road surface within the limits of the road width. The side rays at higher points are spread to a less degree and they are also deflected downwardly to a less degree, and hence they will illuminate the same width of the road. At still higher points the side rays will approach the horizontal, the spread of these rays will be correspondingly diminished or more nearly parallel so that they will illuminate the same width of the road, and they will serve for distant illumination, and these rays are more concentrated to compensate for the increased area of the road which a given unit area of the reflector rays must illuminate, due to the diminishing angle at which these rays strike the road surface.

While the best results are attained by generating the curve representing the curvature of the reflector in its central vertical plane in mathematical accordance with the method herein described, it is to be understood that the objects of the present invention may be attained to a substantial degree by a curvature which conforms substantially with that described.

I claim as my invention:—

1. A reflector for projecting light rays whose curvature in one plane is defined by a curve which is generated by a curved directrix, every point in the curve being equidistant from the focus and the directrix.

2. A reflector for projecting light rays having a curvature which is generated by a curve every point in which is equidistant from the focus and a directrix which deviates from a straight line in a direction away form said curve.

3. A reflector for projecting light rays from a source of light situated at its focus, having a curvature in one plane which corresponds to a curve, every point in which is equidistant from the focus and an arcuate directrix which bends away from such curve.

4. A reflector for projecting light rays from a source of light situated at its focus, having on a diameter thereof, a curvature corresponding to a curve, every point in which is equidistant from the focus and a directrix arc, the axis of which is located substantially at finity of lines extended one at a perpendicular from one end of a line defining the diameter of the reflector and another from the other end of such line and at an angle to the first mentioned line equal to the maximum angle of deflection of the light rays to be produced.

5. A reflector for projecting light rays from a source of light situated at its focus having in its vertical plane a curvature every point in which is equidistant from the focus and a directrix arc the axis of which is situated toward the intersection of straight lines which converge at the convex side of such curvature, the upper line being perpendicular to one end of a third line which defines the vertical diameter of the reflector, and the lower line extending from the opposite end of said third line and inclined to the horizontal at a desired angle of maximum deflection of rays projected by the reflector.

6. A reflector for projecting light rays from a source of light situated at its focus, whose curvature, in the vertical plane thereof, corresponds to a curve having a focus coincident with the center of the source of light and every point in which curve is equidistant from said focus and a directrix which curves away from the said curve, whereby the uppermost light rays will be projected horizontally and all other rays will be deflected downwardly at regularly increasing angles relatively to the uppermost rays.

In testimony whereof I have hereunto set my hand in presence of two subscribing witnesses.

MAURICE P. BROGAN.

Witnesses:
NINA WILLIAMS,
ELIZABETH LaDOUCEUR.